United States Patent
Suit

(10) Patent No.: US 10,970,117 B1
(45) Date of Patent: *Apr. 6, 2021

(54) DYNAMIC CONFIGURATION OF VIRTUAL MACHINES

(71) Applicant: OPEN INVENTION NETWORK LLC, Durham, NC (US)

(72) Inventor: John Michael Suit, Mount Airy, MD (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,189

(22) Filed: Jul. 23, 2019

Related U.S. Application Data

(63) Continuation of application No. 15/585,015, filed on May 2, 2017, now Pat. No. 10,360,068, which is a continuation of application No. 13/552,879, filed on Jul. 19, 2012, now Pat. No. 9,639,379.

(60) Provisional application No. 61/509,187, filed on Jul. 19, 2011.

(51) Int. Cl.
  *G06F 9/50* (2006.01)
  *G06F 9/48* (2006.01)
  *G06F 9/455* (2018.01)
  *G06F 9/445* (2018.01)

(52) U.S. Cl.
  CPC ............ *G06F 9/5016* (2013.01); *G06F 9/455* (2013.01); *G06F 9/45558* (2013.01); *G06F 9/48* (2013.01); *G06F 9/44521* (2013.01); *G06F 2009/45575* (2013.01)

(58) Field of Classification Search
  CPC ............ G06F 9/45558; G06F 9/45533; G06F 2009/4557; G06F 9/5077; G06F 2009/45583; G06F 11/14; G06F 12/0804; G06F 9/5072; G06F 11/2097; G06F 2009/45562; G06F 2009/45591; G06F 11/1484; G06F 9/50; G06F 11/1438; G06F 9/5016; G06F 9/455; G06F 9/48; G06F 2009/45575
  See application file for complete search history.

(56) References Cited

U.S. PATENT DOCUMENTS

| | | | | |
|---|---|---|---|---|
| 7,698,705 B1 * | 4/2010 | Czajkowski | ........ | G06F 11/3409 718/1 |
| 8,286,174 B1 * | 10/2012 | Schmidt | .............. | G06F 9/45533 718/104 |
| 8,615,579 B1 * | 12/2013 | Vincent | ................ | G06F 9/4893 709/224 |

(Continued)

OTHER PUBLICATIONS

Anonymous, Microsoft Computer Dictionary, Microsoft Press, Mar. 15, 2015.

*Primary Examiner* — Dong U Kim

(57) ABSTRACT

A method and apparatus are disclosed to identify the operations/processes performed by one or more virtual machines. In one example method of operation, the system may perform identifying processes currently operating in an operating system and recording process information corresponding to each of the processes in a memory. The method may also include determining a priority for each of the processes currently operating in the operating system and incrementing a current priority of at least one of the processes.

20 Claims, 4 Drawing Sheets

(56) References Cited

U.S. PATENT DOCUMENTS

| | | | |
|---|---|---|---|
| 2005/0256931 A1* | 11/2005 | Follmeg | H04L 12/1859 709/206 |
| 2006/0143617 A1* | 6/2006 | Knauerhase | G06F 9/50 718/104 |
| 2007/0226449 A1* | 9/2007 | Akimoto | G06F 11/3447 711/170 |
| 2008/0141246 A1* | 6/2008 | Kuck | G06F 9/4843 718/1 |
| 2008/0201383 A1* | 8/2008 | Honigfort | G06F 16/217 |
| 2009/0300414 A1* | 12/2009 | Huang | G06F 9/45558 714/11 |
| 2010/0186016 A1* | 7/2010 | Chan | G06F 9/4881 718/103 |
| 2011/0302578 A1* | 12/2011 | Isci | G06F 9/5077 718/1 |
| 2012/0166624 A1* | 6/2012 | Suit | G06Q 10/00 709/224 |
| 2013/0081014 A1* | 3/2013 | Kadatch | G06F 3/067 718/1 |

\* cited by examiner

DYNAMIC CONFIGURATION OF VIRTUAL MACHINES

TECHNICAL FIELD OF THE INVENTION

The present invention is generally related to a dynamic virtual machine configuration procedure, and more particularly, to an application used to identify activity associated with a virtual machine and perform inferences used to dynamically configure the virtual machine.

BACKGROUND OF THE INVENTION

Currently, traditional enterprise networks may include various nodes that contribute to an overall business process. The network nodes may include both physical and virtual machines. Enterprise networks may include virtual machines and physical hosts, which are required to provide an allocation of resources. Physical hosts do not have information associated with an underlining guest's ability to perform tasks and/or processes associated with their use in a business environment. A greater understanding of the guest's ability to perform their intended task(s) may be derived by monitoring and processing data available through the host's and guest's APIs. By monitoring the data associated with the APIs it is possible to apply processes that will yield an ideal resource allocation for one or more virtual machines.

SUMMARY OF THE INVENTION

An example embodiment of the present invention may include a method of identifying, via a processor, a plurality of processes currently operating in an operating system. The method may also include recording process information corresponding to each of the processes in a memory and determining, via the processor, a priority for each of the plurality of processes currently operating in the operating system. The method may also include incrementing, via the processor, a current priority of at least one of the plurality of processes.

Another example embodiment of the present invention may include an apparatus that includes a memory and a processor configured to identify a plurality of processes currently operating in an operating system, record process information corresponding to each of the processes in the memory, determine a priority for each of the plurality of processes currently operating in the operating system, and increment a current priority of at least one of the plurality of processes.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
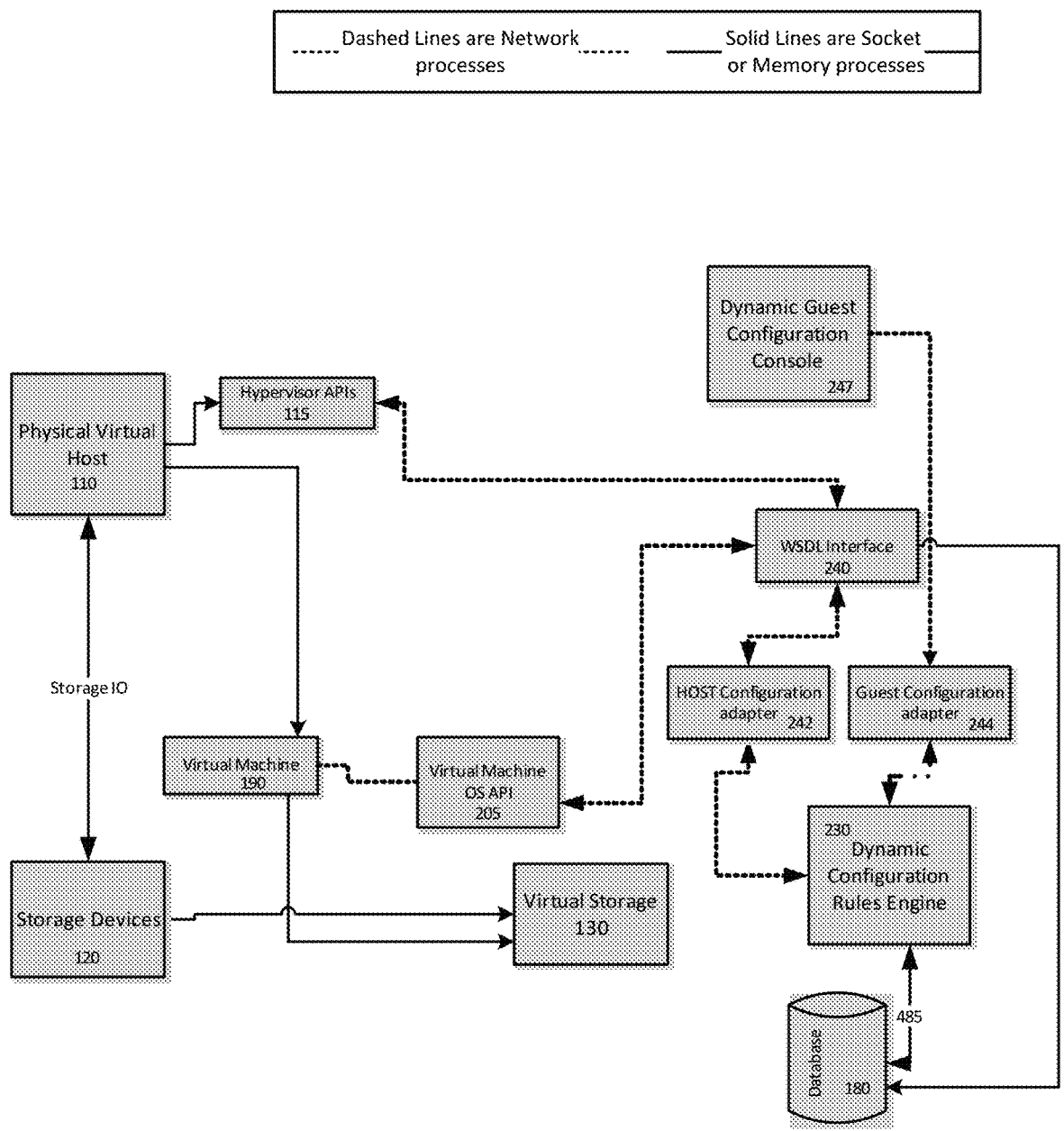
FIG. 1 illustrates a logic diagram of a virtual machine communication interface of a virtual storage configuration according to example embodiments of the present invention.

Example embodiments of the present disclosure provide a system, method and/or device configured to automatically determine a virtual machine's ideal resource allocation as managed by a virtualization hypervisor device ('hypervisor'). Referring to FIG. 1, a physical virtual host 100 may enable a hypervisor resource allocation manager. The hypervisor, also known as a virtual machine manager (VMM), is a hardware virtualization technique which allows multiple operating systems or guests to run concurrently on a host computer. The hypervisor is conceptually one level higher than a supervisory program. The hypervisor may operate by the hypervisor application programming interfaces (APIs) 115 and may present to the guest operating systems a virtual operating platform and manage the execution of the guest operating systems. Multiple instances of a variety of operating systems may share the virtualized hardware resources of the physical host device 110 through the hypervisor. The hypervisor may be installed on server hardware with the function of operating guest operating systems acting as servers.

The virtual machine (VM) 190 may be a completely isolated guest operating system installation within a normal host operating system. The virtual machines are implemented with software emulation and/or hardware virtualization. According to one example, observing metadata input from the application programming interface (API) of the virtualization management system may offer a current "status." The status information retrieved may be correlated with a virtual machine's operating system status, which is provided by the API inputs from both the physical host device providing the resource allocation and the guest's internal OS APIs such as VIX and WINCP.

In operation, a console web service definition language (WSDL) interface 240 may request enterprise virtualization information that includes the currently identified virtual machines 190, virtual storage information 130 that the VMs 190 are utilizing, and any corresponding virtual network components. For each virtual machine 190 the virtual machines APIs 205 (i.e., VIX and WMI) will report allocation for each virtual machine. The allocation may include resources, such as memory usage, storage capacity usage, network devices used in correlation with the VM operation and, CPU usage. Examples of such usage may include, for example, memory usage of 4 Gigabytes, storage allocation of 100 Gigabytes, a network device VMWARE network TCP/IP protocol adapter, etc.

The API 205 will return a current allocation utilized by the virtual machine(s) for each of these allocations. The use of another API, such as WMI may also be utilized. For the status on network connections, a network stack monitor, such as 'NetStat' (network statistics) is used as a command-line tool that displays network connections, both incoming and outgoing connections, routing tables, and a number of network interface statistics. Netstat operates on UNIX, UNIX-compatible, and WINDOWS NT-based operating systems.

The APIs 205 and 410, illustrated in the communication architecture in FIG. 1, may provide detailed information about the allocation and performance of the virtual machines operating in the environment. The APIs 205 and 410 should be considered standard in a modern virtual enterprise environment. The guest APIs allow for the alteration of process priority and CPU affinity and settings indicating that the APIs provide a large variety of features found in any hardware/software platform virtual environment. A VM status of a VM 190 may be based on a VM that is presently 'on' and operating with a status that is a current measurement of the usage based on a known allocation. For example, VM 190 may be operating with a memory of 2.1 Gigabytes used for a 4 Gigabyte allocation.

The operating system of the computer device used to access the virtual machine may initiate an API call over the network to request a VM state and network connectivity. A VM or physical machine that is requesting a specification and/or statistics (i.e., usage) of another machine via an API such as WMI may be required to be on the same network segment. For example, a machine resident on the same network segment may conduct the API request and report the results to the inference engine.

The VIX API (or "Vix") is a library for writing scripts and programs to manipulate virtual machines. It is high-level, easy to use, and practical for both script developers and application programmers. VIX API operates on Microsoft WINDOWS and LINUX platforms. Windows management instrumentation (WMI) is the primary management technology for Microsoft® Windows® operating systems. It enables consistent and uniform management, control, and monitoring of systems throughout an enterprise. WMI allows system administrators to query, change, and monitor configuration settings on desktop and server systems, applications, networks, and other enterprise components. System administrators can write scripts that use the WMI scripting library to work with WMI and create a wide range of systems management and monitoring scripts. WMI is installed natively in the Windows operating system.

The correlation operation may yield a "resource allocation status" that is assigned to the elements of resource allocation including but not limited to a present CPU utilization, a memory allocation, network resource allocation, and/or memory storage allocation. The present state information is then monitored to determine if a change in configuration is beneficial to the overall virtual environment. An optimal resource allocation may be inserted into a new or existing work order for an orchestration component of the virtual enterprise environment to be updated. For example, the present state information may indicate that a current operating parameter, such as CPU, memory usage, etc. has exceeded a threshold of 90%, in which case, the present state information is yielding that an adjustment should be made to accommodate the over utilization of resources.

Established thresholds may be directly related to a node "State." The state may be defined as an indicator to the system, and may require the user of the business application service to meet a threshold requirement. The operation to determine a current state of an individual element may be based on a threshold that has been defined, for example, by the system administrator. The threshold may include a metric that either exceeds or underperforms in a specific area of interest to the system administrator. An example would be a server in a network that is exceeding a specified CPU utilization percentage.

An optimal configuration of a guest is achieved by modifying the priority of processes and/or services utilized by the guest in conjunction with the resource allocation of the guest itself by the host. A first candidate virtual machine (VM) being monitored may be suspended and the changes to the configuration may be made. The VM is resumed and a new "resource allocation status" is calculated by the process. If the "resource allocation status" falls below a predefined threshold the process may be initiated. The system may observe the internal process CPU and memory consumption of the candidate VM by monitoring the virtual machine's operating system. If the resource allocation of the VM fails to achieve an optimal state after the cycle is repeated 3 consecutive times then the VM may be identified as requiring a change in state. This monitored data may be utilized by an inference engine to determine if a delta exists outside the normal loss of efficiency for virtual machines for a given virtual infrastructure. As a result, a work order may be created to increment the resource allocation by the hypervisor API to compensate accordingly, and a message is sent to the virtual infrastructure API of the candidate VM as being an ideal candidate for a dynamic configuration. If the candidate VM achieves an optimum efficiency it may be monitored for 3 consecutive cycles and if no change is determined, the system may iterate to the next VM as sorted by the virtual infrastructure provider.

In one example of operation, a priority of a process may be established by selecting the process from a list of currently operating processes on a particular machine. Next, the process may have its corresponding priority set to a certain level, such as 'high', 'normal' or 'low'. The efficiency thereafter of the process may be observed as an allocated parameter based on a predefined threshold used to determine whether the process is currently utilizing the amount of CPU usage considered nominal for that priority of the process.

A cycle is a task that a VM 190 is required to perform. An interface may be provided that allows a user to build a baseline on a blank template, adding the components that are required to perform the functions of a service group of VMs and corresponding functions performed. Because the primary application and/or purpose for the VM's existence is known then it can be assigned a state. In one embodiment, the state of a primary application may be determined by combining the states of prioritized processes. The state of a primary application may be determined by monitoring both processes and executables and service communication and performance on the node of the VM that executes the executables and processes.

Detection of failures of a business application service may be performed by monitoring the health of the components of the service group that performs the business application service as well as the connections between these components. There are several factors that contribute to the overall health or "state" of the node (VM). Parameters, such as CPU usage, memory usage, network uptime, etc. are each indicators of the state of a business application. If the primary application's components (executable application and/or services) are unable to communicate or perform within acceptable parameters then this can greatly affect the performance of a node (VM). The monitoring system application may be used to monitor the state of the primary applications by monitoring the executables and service communication and performance on the nodes themselves.

State may be defined as an entity (whether virtual or physical) associated with a node. Any node may have a "state" established by, for example, detection of a physical condition of the node at a discrete moment in time. The state may be established, for example, on the basis of assigning a threshold value for a particular parameter, followed by monitoring the parameter for any changes. Example parameters may include, without limitation, CPU usage, memory usage and/or storage capacity utilized, network uptime, configuration drift, and/or alerts or alarms from the network. These parameters are monitored by requests and responses from the VIX API and WMI for example.

The components of the enterprise configuration utilized by example embodiments of the present invention may include those commonly associated with an enterprise virtualization implementation. Such enterprise components may be utilized to emulate a physical enterprise computing environment. The components must be configured to efficiently exchange data and process information for business applications. The APIs associated with both the hosts and guests need to be enabled and set at a maximum level. Examples of APIs would include VMAPI, VIX, Windows API, WinAPI, WinCP, and ancillary reporting applications such as Netstat.

According to example embodiments, the network components used in the enterprise network may include a least one physical host, a network device such as a virtual router capable of performing virtual Networking, and physical routers capable of providing network access to the physical network infrastructure. Additional network components include at least one storage device 120 capable of providing access to a virtual infrastructure.

According to example embodiments, application components required may include a hypervisor management platform such as VMWare ESX server, VMWare vSphere management software, Microsoft Hyber V, Microsoft SCVMM, Microsoft Server, Virtual Storage Vendor's APIs, a database such as, SQL Server and/or Oracle, and a web based console server. Further components may include a rules engine such as OpenRules, Mandarax, or Drools.

Referring to FIG. 1, the console web service definition language (WSDL) interface 240 may transmit a request for enterprise virtualization information from the various APIs including virtual machine operating system (OS) API 205 and API interface 410. These APIs provide detailed information about the allocation and/or performance of the virtual machine(s) 190 operating in the enterprise environment. These guest APIs allow for the alteration of process priority and CPU affinity and other settings.

Access to the API 205, such as WMI allows the priority for each process and application or executable to be set. Through the WMI API 205, the priority may be set programmatically. For example, to change the priority, the following function may be performed: Const ABOVE_NORMAL=32768 strComputer="." Set objWMIService=GetObject("winmgmts:"_& "{impersonationLevel=impersonate}!\\" & strComputer & "\root\cimv2") Set objStartup=objWMIService. Get("Win32_ProcessStartup") Set objConfig=objStartup.SpawnInstance_objConfig.Priority Class=ABOVE_NORMAL Set objProcess=GetObject ("winmgmts:root\cimv2:Win32_Process") objProcess.Create "Notepad.exe", Null, objConfig, intProcessID.

The process priority range includes a priority class value of normal 32, low 64, real-time 128, high 256, below normal 16384, above normal 32768, etc. Examples of the API information for the hypervisor API 115 may include Host ID, Host Name, Host IP, Host Mac, Host memory resource and allocation, Host storage resource and allocation, Host storage resource and allocation. Examples of VM information may include VM ID, VM name, VM IP, VM Mac, VM memory resource and utilization, VM storage resource and utilization, VM storage resource and utilization. VM network type, resource, and status, etc. The virtual machine OS API 205 may include a machine name, machine IP, machine mac, machine netstat connections, machine applications, machine performance, mon stats, machine processes, machine services, service, affinity, priority, CPU, and memory.

The 'Netstat' application may be provided by the virtual machine OS API 205 to provide local address, foreign address, state, protocol, process ID, received packets, received bytes, sent bytes, etc. The specification for the WSDL 240 may include a virtual machine IP address, an application source, a destination IP address, an application process list, performance statistics (Prefmon), a standard O/S configuration files list, and state statistics from the O/S.

Applications required to accomplish a dynamic configuration of the guest may include a standard OS process communication monitoring program, such as 'NETSTAT', an inference engine, a relational database repository 180, a continually updating OS API that includes process and service priority and CPU affinity. The data from the host API and the guest API are accumulated from the APIs and deposited in the DB 180. The dynamic configuration rules engine 230 retrieves the API data for both the host and guest. The rules engine 230 records the priority of each application that it associates with the processes and services that are present in the 'Netstat' data collected from the guest via the guest API. The 'Netstat' data includes the applications which are communicating with other nodes in the environment.

The identified applications are recorded by the rules engine and are examined for their priority within the operating system along with the physical virtual host's CPU affinity for the guests that execute those applications. The rules engine then increases the level of priority by one level. For example, if the process or service associated with the application in the Netstat is "normal" the rules engine will send the request to the guest configuration adapter to change the process or services priority to "above normal." While the rules engine gathers data on the 'Netstat' application(s) the processes and services that are not 'Netstat' based, are then examined for a reduction in priority. The rules engine will send a request to the guest configuration adapter 244 to iterate the application priority downward depending on the data received from the host API. For the 'Netstat' non-related applications, the range that the rules engine will iterate though is low, below normal, or normal. The participating VMs 190, as assigned by the host configuration console 242, are queried for its API data and 'Netstat' application data. A dynamic guest configuration console 247 may be used to perform the configuration of adapter 244. This data may be obtained via direct request or proxy though a broker. The 'Netstat' data may gather via a remote desktop protocol (RDP) connection or guest based agent.

The dynamic guest configuration adapter 244 may transmit a message to the rules engine to continually gather the data from the same sources to monitor progress at 5 minute intervals. The rules engine will send a request to the guest configuration adapter 244 to iterate the application priority upward depending of the data received from the host API. The range that the rules engine will iterate though is low, below normal, normal, above normal, or high. The real-time process setting is not included in this range.

Figure 2:
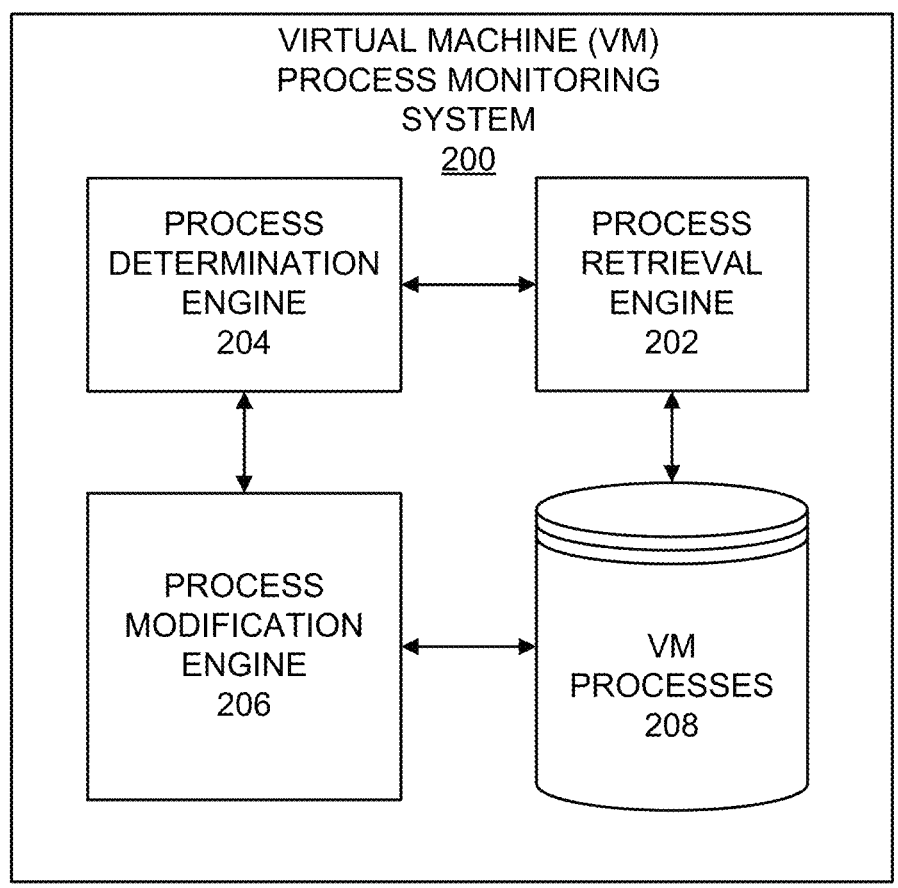
FIG. 2 illustrates an example virtual machine system configured to perform various operations associated with the example embodiments of the present invention.

FIG. 2 illustrates an example virtual machine system 200 configured to perform various operations associated with the example embodiments of the present invention. Referring to FIG. 2, the system may include a set of modules/engines and a database configured to perform a method of process identification and prioritization. A process retrieval engine 202 may be used to identify a plurality of processes currently operating in an operating system of a VM or other computing device (logical or physical). A process determination engine 204 may record process information corresponding to each of the processes in a memory (i.e., VM processes databank 208). The method may also include determining a priority for each of the plurality of processes currently operating in the operating system and incrementing a current priority of at least one of the plurality of processes by the process modification engine 206.

The incrementing the current priority of the at least one process includes modifying the process to have an increased amount of central processor unit (CPU) utilization or memory utilization. The current priority may be increased by one increment level at a time, such as from a present status of normal to an increased level of above normal. The method may also perform decrementing a priority for at least one of the other plurality of processes. The incrementing a current priority of the process may be performed to increase the current priority of the process based on usage data of a physical host application programming interface (API) associated with the current priority of the process. The processes may be operating via at least one virtual machine.

Example embodiments are preferably realized in a hardware device, such as, a computer, cellular phone, or other mobile terminal device, etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components of the other figures.

Figure 3:
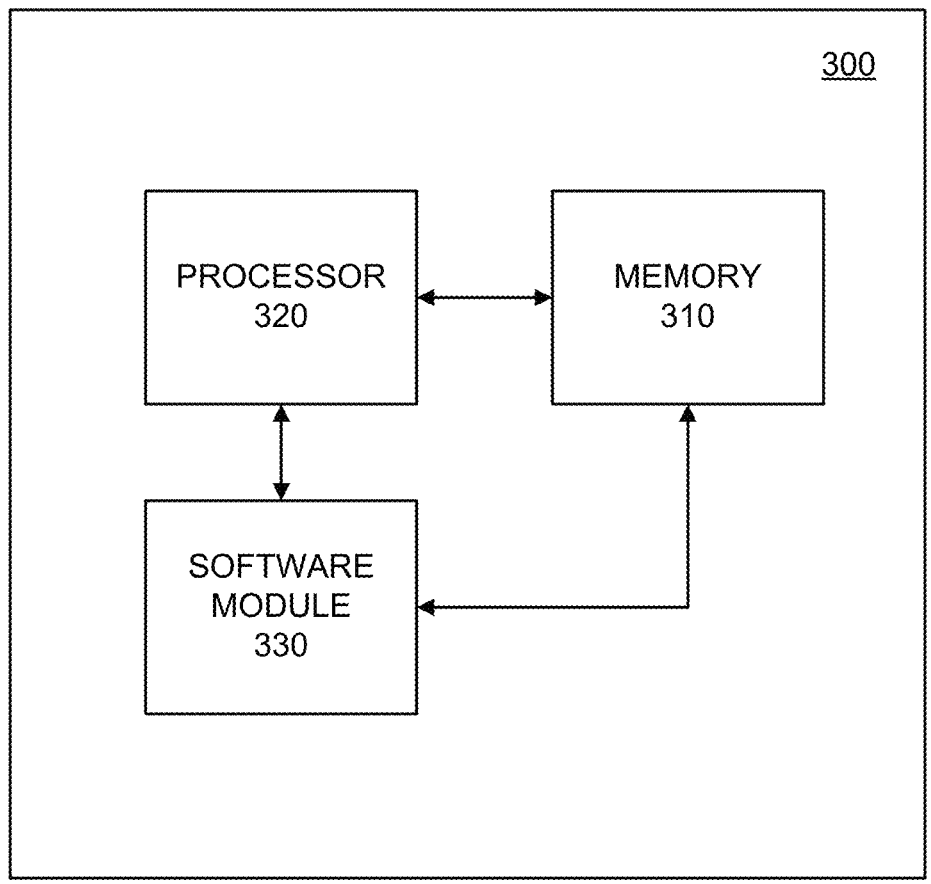
FIG. 3 illustrates an example network entity configured to store instructions and processing hardware for performing operations according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
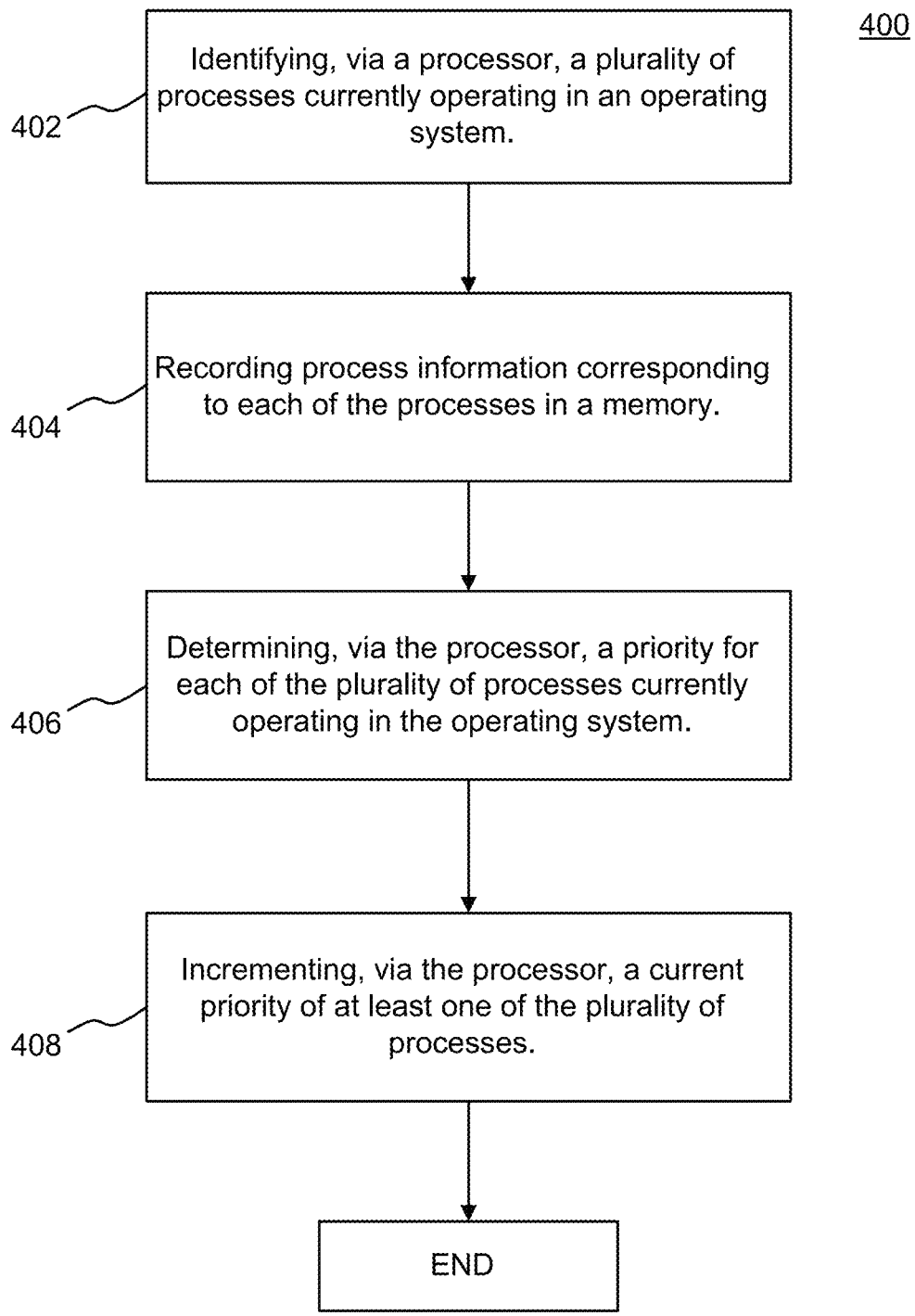
FIG. 4 illustrates an example flow diagram of a method of operation according to example embodiments of the present invention.

FIG. 4 illustrates an example method of operation according to example embodiments. Referring to FIG. 4, an example method of operation may include identifying, via a processor, a plurality of processes currently operating in an operating system at operation 402. The method may also include recording process information corresponding to each of the processes in a memory for later reference at operation 404. The method may also provide determining, via the processor, a priority for each of the plurality of processes currently operating in the operating system at operation 406. The priority may be based on known preferences or automated prioritization mechanisms. The method may also include incrementing, via the processor, a current priority of at least one of the plurality of processes at operation 408.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   incrementing, via a processor, a current priority of at least one of a plurality of processes currently operating in an operating system of a virtual machine to create a modified priority of the at least one process based on usage data of a physical host application programming interface associated with the current priority of the at least one process;
   identifying an efficiency of the at least one process over a predefined number of operating cycles is below a predetermined threshold value which is used as a basis to identify whether the at least one process is currently utilizing an amount of central processing unit (CPU) usage associated with the modified priority assigned to the at least one process;
   suspending operation of the virtual machine;
   modifying a present resource allocation utilized by the virtual machine to increase or decrease at least one operational parameter included in the present resource allocation; and
   resuming operation of the virtual machine.

2. The method of claim 1, wherein incrementing the current priority of the at least one process comprises modifying the at least one process to have an increased amount of the CPU utilization.

3. The method of claim 1, wherein the current priority is increased by one increment level.

4. The method of claim 3, wherein the one increment level is presently normal and is increased to above normal.

5. The method of claim 1, further comprising decrementing a priority for at least one of the other plurality of processes.

6. The method of claim 1, further comprising identifying, via the processor, the plurality of processes currently operating in the operating system.

7. The method of claim 1, further comprising determining, via the processor, the current priority for each of the plurality of processes currently operating in the operating system.

8. A processor, configured to:
   increment a current priority of at least one of a plurality of processes currently operating in an operating system of a virtual machine to create a modified priority of the at least one process based on usage data of a physical host application programming interface associated with the current priority of the at least one process;
   identify an efficiency of the at least one process over a predefined number of operating cycles is below a predetermined threshold value which is used as a basis to identify whether the at least one process is currently utilizing an amount of the processor usage associated with the modified priority assigned to the at least one process;
   suspend operation of the virtual machine;
   modify a present resource allocation utilized by the virtual machine to increase or decrease at least one operational parameter included in the present resource allocation; and
   resume operation of the virtual machine.

9. The processor of claim 8, wherein the current priority of the at least one process is incremented by modifying the at least one process to have an increased amount of the processor utilization.

10. The processor of claim 8, wherein the current priority is increased by one increment level.

11. The processor of claim 10, wherein the one increment level is presently normal and is increased to above normal.

12. The processor of claim 8, wherein the processor is further configured to decrement a priority for at least one of the other plurality of processes.

13. The processor of claim 8, wherein the processor is further configured to identify the plurality of processes currently operating in the operating system.

14. The processor of claim 8, wherein the processor is further configured to determine the current priority for each of the plurality of processes currently operating in the operating system.

15. A non-transitory computer readable storage medium configured to store instructions that when executed cause a processor to perform:
   incrementing, via a processor, a current priority of at least one of a plurality of processes currently operating in an operating system of a virtual machine to create a modified priority of the at least one process based on usage data of a physical host application programming interface associated with the current priority of the at least one process;
   identifying an efficiency of the at least one process over a predefined number of operating cycles is below a predetermined threshold value which is used as a basis to identify whether the at least one process is currently utilizing an amount of central processing unit (CPU) usage associated with the modified priority assigned to the at least one process;
   suspending operation of the virtual machine;
   modifying a present resource allocation utilized by the virtual machine to increase or decrease at least one operational parameter included in the present resource allocation; and
   resuming operation of the virtual machine.

16. The non-transitory computer readable storage medium of claim 15, wherein incrementing the current priority of the at least one process comprises modifying the at least one process to have an increased amount of the CPU utilization.

17. The non-transitory computer readable storage medium of claim 15, wherein the current priority is increased by one increment level.

18. The non-transitory computer readable storage medium of claim 17, wherein the one increment level is presently normal and is increased to above normal.

19. The non-transitory computer readable storage medium of claim 15, wherein the processor is further configured to perform decrementing a priority for at least one of the other plurality of processes.

20. The non-transitory computer readable storage medium of claim 15, wherein the processor is further configured to identify the plurality of processes currently operating in the operating system.

\* \* \* \* \*